United States Patent [19]

Bando et al.

[11] Patent Number: 4,509,614
[45] Date of Patent: Apr. 9, 1985

[54] WORKING VEHICLE EQUIPPED WITH ENGINE AUTOMATIC STOP DEVICE

[75] Inventors: Niro Bando; Kazuaki Kurohara; Yasuo Fujima, all of Sakai; Fumihiro Ikeda, Osaka; Kenzo Usiro, Sakai; Hiroyuki Ogasawara, Izumi, all of Japan

[73] Assignee: Kubota Ltd., Osaka, Japan

[21] Appl. No.: 492,249

[22] Filed: May 6, 1983

[30] Foreign Application Priority Data

Dec. 13, 1982 [JP] Japan .............................. 57-218082

[51] Int. Cl.³ ............................................ B60R 21/00
[52] U.S. Cl. .................................. 180/273; 74/483 R
[58] Field of Search ............ 180/272, 273; 74/483 R, 74/856

[56] References Cited

U.S. PATENT DOCUMENTS

| 3,229,452 | 1/1966 | Hasenbank | 180/273 |
| 3,334,488 | 8/1967 | Lauck | 180/273 |
| 3,700,062 | 10/1972 | Garnett | 180/273 |
| 4,037,695 | 7/1977 | Welck | 74/483 R |
| 4,221,277 | 9/1980 | Mastropieri | 180/273 |
| 4,347,910 | 9/1982 | Deguara | 180/272 |

Primary Examiner—Joseph F. Peters, Jr.
Assistant Examiner—Ross Weaver
Attorney, Agent, or Firm—Cushman, Darby & Cushman

[57] ABSTRACT

A working vehicle equipped with engine automatic stop device, having a vertically movable seat and an engine adapted to be stopped when the operator leaves the seat. There is disposed a restraining mechanism for preventing the engine from being stopped even though the operator leaves the seat when a clutch at a power take-out shaft is disengaged.

5 Claims, 4 Drawing Figures

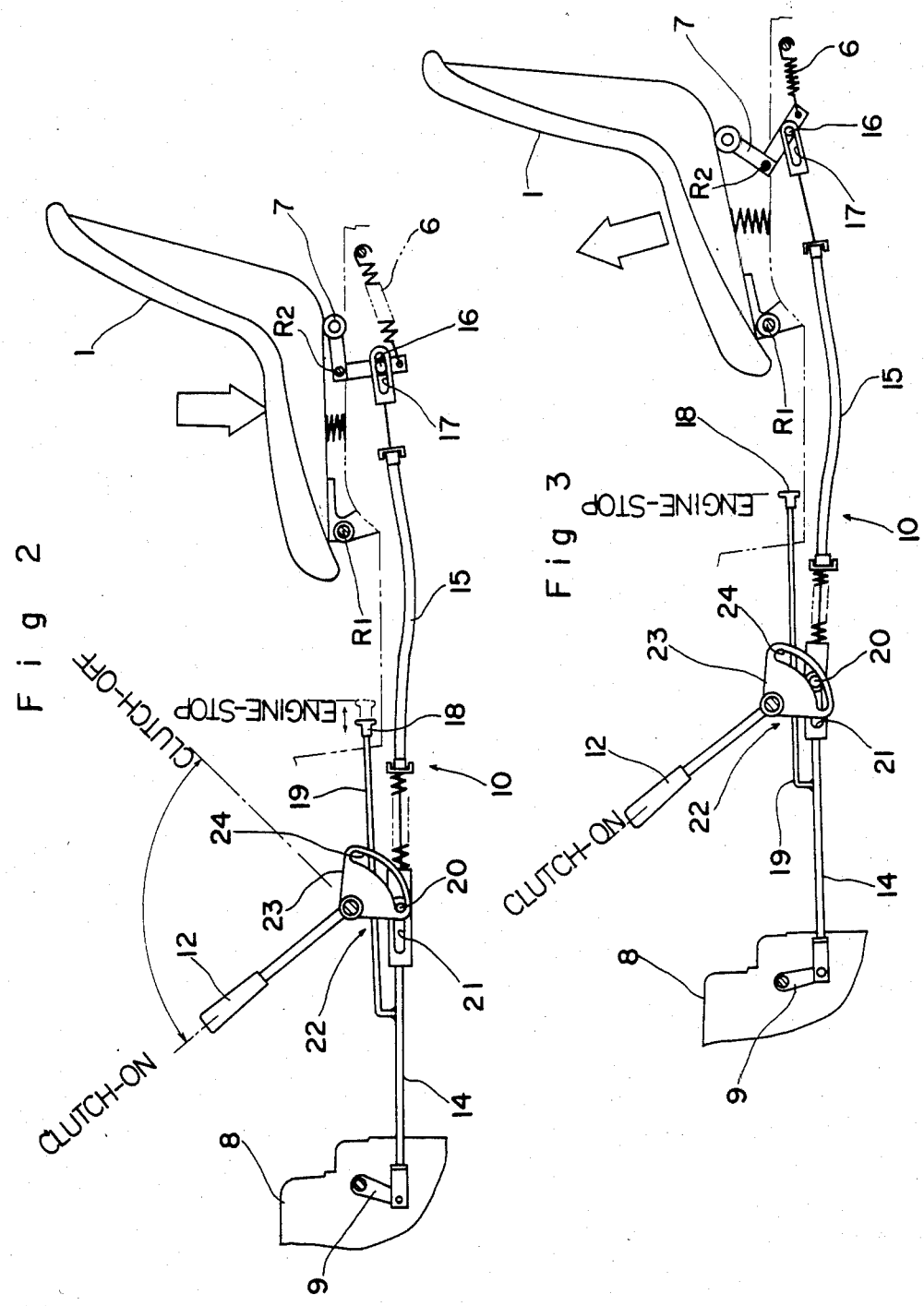

WORKING VEHICLE EQUIPPED WITH ENGINE AUTOMATIC STOP DEVICE

BACKGROUND OF THE INVENTION (1) Field of the Invention

The present invention relates to a working vehicle equipped with engine automatic stop device, comprising means for engaging and disengaging a clutch disposed in a transmission system from an engine to a power take-out shaft, and means for automatically stopping the engine in which a sitting sensor so spring-loaded as to push up a vertically movable seat when load applied to the seat becomes below a predetermined amount, is mechanically interlocked with engine stop means such that pushing-up of the sitting sensor causes the engine stop means to become operable to stop the engine.

(2) Description of the Prior Art

In such working vehicle equipped with engine automatic stop device of the type above-mentioned, mechanical interlocking of the sitting sensor with the engine stop means may provide more reliable engine stop, as compared with electrical interlocking susceptible to troubles, such as an arrangement disclosed in U.S. Pat. No. 4,198,092.

However, a conventional arrangement in which the sitting sensor is mechanically interlocked all the time with the engine stop means, presents inconveniences described below.

It is desired to automatically stop the engine only when the operator buttocks completely leave the seat, for example, due to his unexpected fall from the working vehicle during its travelling with an attached working machine driven. There is actually a case where the engine is automatically stopped to suddenly stop the vehicle body when the operator buttocks slightly come up from the seat due to vibration or swing of the vehicle during its travelling on a rough field. Such stop is not only unfavorable in view of lowered working efficiency, but also involves a risk that the operator falls forward.

In this connection, the sitting sensor is generally so constructed as not to sense slight push-up of the seat, but to become operable to actuate the engine stop means only when the seat is pushed up to a position too high to be sit thereon. Accordingly, when the sitting sensor is interlocked all the time with the engine stop means as conventionally done, the seat is located at a high position when the operator intends to sit thereon, because the seat normally remains as pushed up by the sitting sensor as far as the operator buttocks are not placed on the seat. On the other hand, when the operator intends to get up from the seat, the seat is pushed up to force up the operator buttocks as the operator raises his buttocks. Thus, such conventional interlocking causes inconvenience when the operator sits on and gets up from the seat.

SUMMARY OF THE INVENTION

It is an object of the present invention to provide a working vehicle equipped with an engine automatic stop device in which the engine is adapted to be automatically stopped to assure safety when no normal operation can be made with the operator buttocks left the seat, while the engine is not stopped even if the seat angle is more or less vertically varied due to vibration or the like, and with which the operator encounters no inconvenience when he sits on or gets up from the seat.

In order to achieve the object above-mentioned, the working vehicle equipped with an engine automatic stop device in accordance with the present invention is proposed taking the following facts into account:

(A) A clutch at a power take-out shaft is disengaged when the operator gets out from the vehicle; and (B) The clutch at the power take-out shaft is engaged all the time during operation of the vehicle.

The present invention is characterized by provision of a restraining mechanism for automatically preventing the sitting sensor from pushing up the seat by spring load, in association with the movement of a clutch operating means to its clutch disengaging position.

According to the present invention having the characteristic above-mentioned, the sitting sensor is permitted to push up the seat by spring load only when the clutch at the power take-out shaft is engaged, while such pushing-up is prevented when the clutch at the power take-out shaft is disengaged.

Accordingly, in case of danger where the operator buttocks completely leave the seat due to his fall from the travelling vehicle with an attached working machine driven, the sitting sensor becomes operable to automatically stop the engine, thus assuring safety. On the other hand, a large working stroke available for the sitting sensor prevents the engine from being automatically stopped when the operator buttocks are barely raised up from the seat.

Ensuring an efficient and safe operation, such arrangement enables the seat to be located at a normal or low position when the operator intends to sit on and get up from the seat, because the sitting sensor is restrained in operation due to disengagement of the clutch at the power take-out shaft at that time. Thus, the operator can easily sit on and get up from the seat.

Other advantages of the present invention will be apparent from the following description.

BRIEF DESCRIPTION OF THE DRAWINGS

FIGS. 2 and 3 are side views, with portions broken away, of main portions of the working vehicle in FIG. 1.

DETAILED DESCRIPTION OF THE PREFERRED EMBODIMENT

Figure 1:
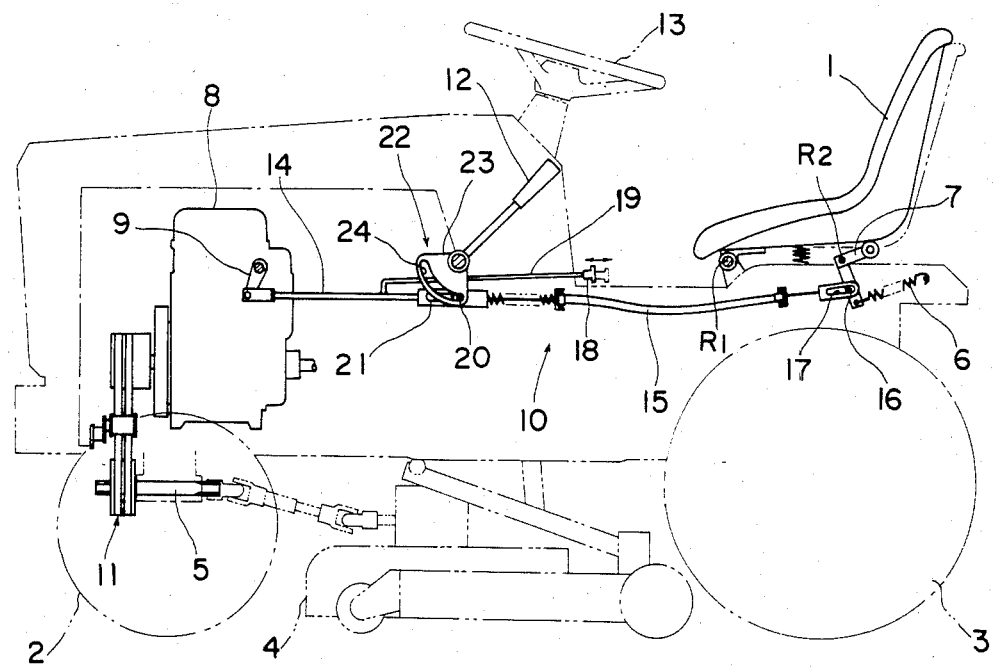
FIG. 1 is a general side view, with portions broken away, of working vehicle equipped with engine automatic stop device in accordance with the present invention.

FIG. 1 illustrates a tractor, as an example of a working vehicle, having a seat 1 vertically swinging around a front fulcrum $R_1$, and a power take-out shaft 5 for driving a working machine 4 (mower or the like) to be attached between front and rear wheels 2 and 3 as shown by immaginary lines.

The tractor also has an engine automatic stop device 10 in which a sitting sensor arm 7 swingingly spring-loaded in the upward direction around a fulcrum $R_2$ by a spring 6 adapted to push up the seat when load applied to the seat becomes below a predetermined amount, is mechanically interlocked with an engine stop lever 9 for a Diesel engine 8 such that swing pushing-up of the arm 7 causes the engine stop lever 9 to take its position to stop the engine 8.

Forward the seat 1, there are disposed a steering handle 13 and a swing-type operating lever 12 for engaging and disengaging a clutch of the belt tension type 11 disposed in a transmission system from the engine 8 to the power take-out shaft 5.

The stop lever 9 is resiliently swung and spring-loaded to a stop position. The lever 9 is interlocked with the arm 7 by a mechanism described below.

As best shown in FIGS. 2 and 3, the interlocking mechanism has a rod 14 capable of swingingly moving the stop lever 9 to a non-stop position against resilient spring load, and a wire 15 for interlocking the rod 14 with the arm 7. The wire 15 is interlockingly connected to the arm 7 through a pin 16. A hole 17 for the pin 16 is formed in slot so as to absorb a difference in working stroke between the stop lever 9 and the arm 7. Connected to the rod 14 is an operating rod 19 having a knob 18 for manually operating the rod 14.

Figure 4:
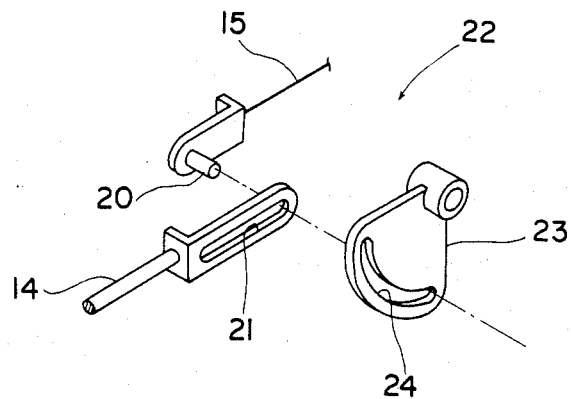
FIG. 4 is an exploded perspective view of enlarged main portions.

As shown in FIG. 4, the rod 14 is interlockingly connected to the wire 15 through a pin 20. A rod-side hole 21 for the pin 20 is formed in slot so as to permit the rod 14 to independently stop the engine 8 through the operating rod 19.

There is disposed a restraining mechanism 22 for preventing the arm 7 from pushing up the seat 1 by spring load, in association with the movement of the clutch operating lever 12 to a clutch disengaging position.

As shown in FIGS. 1 to 4, the restraining mechanism 22 has a plate member 23 connected to the clutch operating lever 12 and having therein a slot 24. The pin 20 for interlockingly connecting the wire 15 to the rod 14 is fitted into this slot 24, such that the slot 24 comes in contact with the pin 20 to prevent the pin 20 from moving in a direction corresponding to the swinging and spring-loading direction of the arm 7 when the operating lever 12 is located at a clutch disengaging position, while permitting the pin 20 to move in the forward direction when the operating lever 12 is located at a clutch disengaging position.

Accordingly, when the clutch operating lever 12 is positioned at a clutch engaging position during operation of the vehicle, and the operator gets up from the seat, the pin 20 is caused to move in the slot 24 without being subjected to restraint by the plate member 23, thereby stopping the engine 8. Thus, when the operator accidently falls down from the vehicle, the engine 8 is immediately stopped.

On the other hand, when the operator intentionally gets out from the vehicle, the clutch operating lever 12 is movingly operated to a clutch disengaging position, so that the plate member 23 restrains the pin 20 from moving. Accordingly, when the operator intentionally gets up from the seat, the seat 1 is not upwardly moved, thus the engine 8 is not stopped.

We claim:

1. A working vehicle equipped with an automatic engine stopping device, comprising:
   an engine stopper mechanism including (a) a sitting sensor having a sensor arm and a spring and adapted to push up a seat when a load applied to the seat is below a predetermined amount, (b) engine stopper means to stop an engine in response to an upward pushing action of said sitting sensor, (c) a wire having one end thereof connected to said sensor arm, and (d) a rod having one end thereof connected to said engine stopper means, said rod and said wire being interconnected at the other end of each through link means attached thereto, respectively,
   clutch operating means for engaging and disengaging a clutch disposed in a transmission system for a power takeoff shaft, and
   restraining means including a restraining member provided on said link means and said clutch operating means, said restraining means for preventing said link means from moving in a first direction to permit said seat to be upwardly pushed while yet permitting said link means to move in a second direction, opposite to said first direction, when said clutch operating means is in a clutch-disengaging position.

2. A working vehicle as in claim 1 wherein said link means attached to said wire includes a pin, and wherein said restraining member defines a slot for receiving said pin.

3. A working vehicle as set forth in claim 2, wherein the rod includes a slot into which the pin is fitted, and wherein said vehicle further comprises an independent engine stop rod connected to said rod.

4. In a vehicle having an engine to propel the vehicle over a surface, a device to automatically stop the engine comprising:
   a seat mounted for pivotal movement between a normal position and a displaced position;
   sensor means operatively engaged with said seat to pivotally move said seat from said normal to said displaced position in response to a load being removed from said seat;
   engine stopping means for stopping said engine;
   clutch operating means manually moveable between clutch-engaged and clutch-disengaged positions for respectively engaging and disengaging a clutch of the vehicle;
   linkage means for operatively interconnecting said sensor means and said engine stopping means, said linkage means operating said engine stopping means in response to said sensor means moving said seat from said normal position to said displaced position to thereby stop the engine when said clutch operating means is in said clutch-engaged position; and
   restraining means operatively connected to said clutch operating means and said linkage means for preventing said sensor means from pivotally moving said seat from said normal to said displaced position when said clutch operating means is in said disengaged position to thereby prevent said engine from being stopped by said engine stopping means in response to said load being removed from said seat.

5. A device to automatically stop an engine of a vehicle during movement of the vehicle comprising:
   clutch operating means manually moveable between a clutch-engaged position and a clutch-disengaged position for respectively engaging and disengaging a clutch mechanism;
   a seat including means to mount said seat to the vehicle for pivotal movement between normal and displaced positions;
   engine stopping means operatively engaged with said seat for moving said seat from said normal position into said displaced position in response to a load being removed from said seat when said clutch operating means is in said clutch-engaged position to thereby automatically stop said engine when said load is removed from said seat; and means operatively connected to said clutch operating means and said engine stopping means for preventing said seat from pivoting into said displaced position when said clutch operating means is in said clutch-disengaged position to thereby prevent said engine from stopping when said load is removed from said seat.

* * * * *